United States Patent
Fong et al.

(10) Patent No.: US 10,631,365 B2
(45) Date of Patent: Apr. 21, 2020

(54) APPARATUS WITH DUAL SUBSCRIBER IDENTITY MODULE (SIM) INTERFACES

(71) Applicant: PPIP LLC, Tempe, AZ (US)

(72) Inventors: Michael Fong, Chandler, AZ (US); Neric Hsin-wu Fong, Tempe, AZ (US); Teddy David Thomas, Bedford, NH (US); Vishal Vaidhyanathan, Tempe, AZ (US)

(73) Assignee: PPIP, LLC, Tempe, AZ (US)

( * ) Notice: Subject to any disclaimer, the term of this patent is extended or adjusted under 35 U.S.C. 154(b) by 0 days.

(21) Appl. No.: 16/194,756

(22) Filed: Nov. 19, 2018

(65) Prior Publication Data

US 2019/0357306 A1 Nov. 21, 2019

Related U.S. Application Data

(60) Provisional application No. 62/588,887, filed on Nov. 20, 2017.

(51) Int. Cl.
*H04W 88/06* (2009.01)
*H04M 1/02* (2006.01)

(52) U.S. Cl.
CPC .......... *H04W 88/06* (2013.01); *H04M 1/026* (2013.01); *H04M 1/0274* (2013.01); *H04M 2250/14* (2013.01)

(58) Field of Classification Search
CPC .... H04W 88/06; H04M 4/029; H04M 1/0274
USPC .......... 455/557, 558, 575.1, 575.8
See application file for complete search history.

(56) References Cited

U.S. PATENT DOCUMENTS

| | | | | |
|---|---|---|---|---|
| 2011/0276819 | A1* | 11/2011 | Dong | G06K 19/0701 713/340 |
| 2012/0047277 | A1* | 2/2012 | Keidar | H04N 21/41407 709/230 |
| 2014/0251368 | A1* | 9/2014 | Lawson | A45C 11/00 132/287 |
| 2018/0234834 | A1* | 8/2018 | Stein | H04L 63/0853 |

* cited by examiner

*Primary Examiner* — Congvan Tran
(74) *Attorney, Agent, or Firm* — Fernando & Partners, LLP

(57) ABSTRACT

In accordance with some embodiments, an apparatus for privacy protection is provided. The apparatus includes a housing arranged to hold a personal communication device, a first subscriber identity module (SIM) interface, a second SIM interface, a personal communication device interface, and a controller. A portion of the personal communication device interface is shaped to mate with a SIM slot of the personal communication device, and the personal communication device interface includes a SIM emulator operable to couple the second SIM interface to the SIM slot of the personal communication device. Through operation of the personal communication device interface, the controller is operable to selectively couple one of the first SIM interface and the second SIM interface to the SIM slot of the personal communication device.

20 Claims, 6 Drawing Sheets

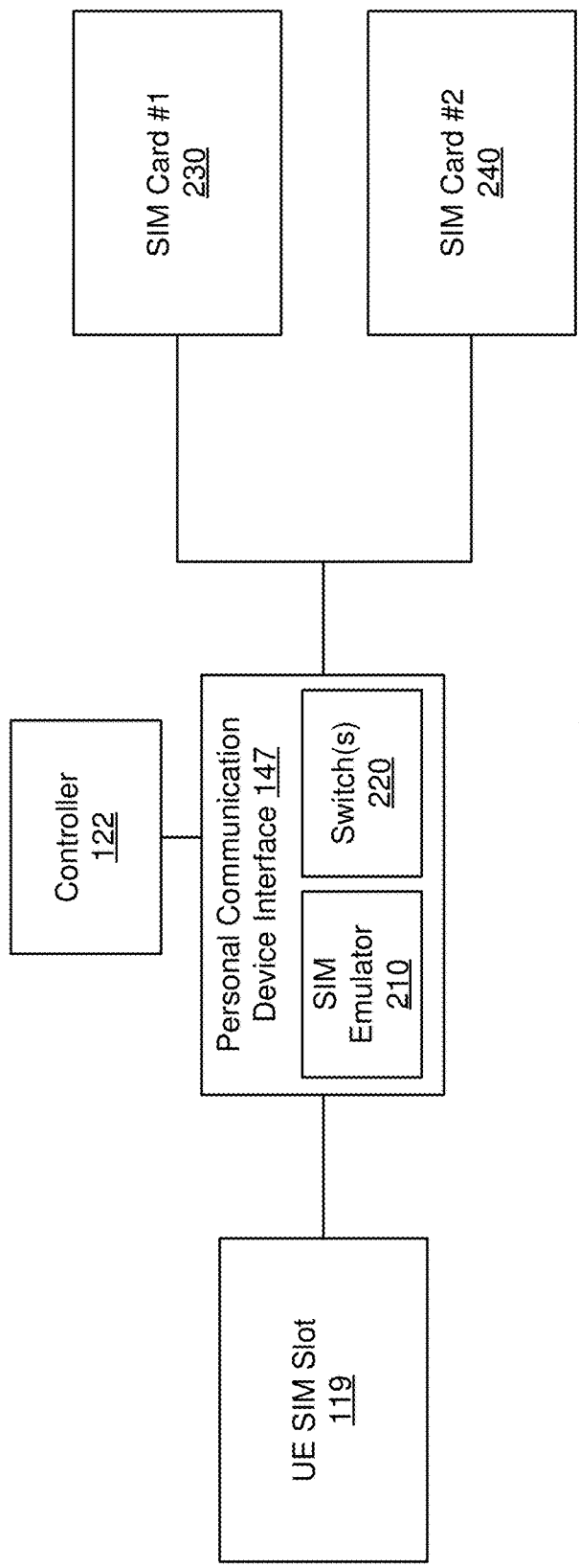
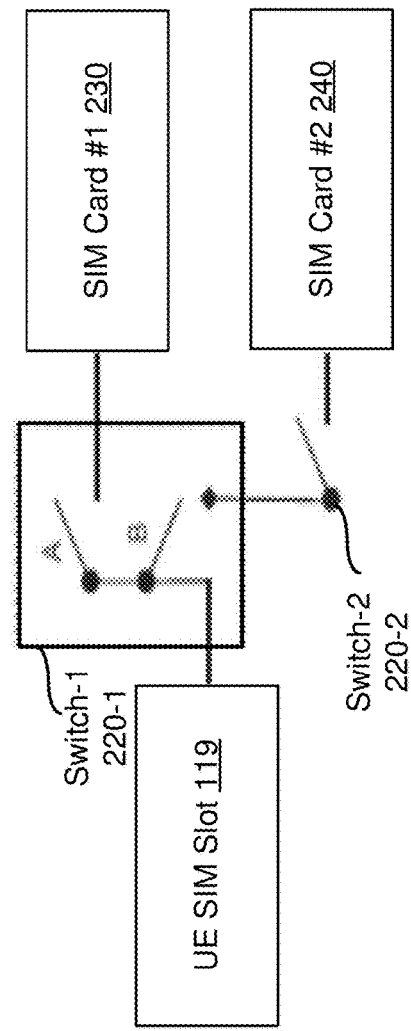
FIG. 2A
FIG. 2B

APPARATUS WITH DUAL SUBSCRIBER IDENTITY MODULE (SIM) INTERFACES

PRIORITY CLAIM

This application claims priority to U.S. provisional patent application No. 62/588,887 filed on Nov. 20, 2017, the contents of which are hereby incorporated by reference.

TECHNICAL FIELD

This relates generally to the field of portable electronic devices, and more specifically to an apparatus with dual subscriber identity module (SIM) interfaces.

BACKGROUND

In wireless communication, a subscriber needs to obtain a subscriber identity from a service provider. Service providers often issue a subscriber identity module (SIM) card, which stores the information representing one identity. As a result, when a user wants to use multiple identities for wireless communication (e.g., one for personal communication, the other for work related communication), the user has to multiple SIM cards with one for each identity. Many devices, however, have a SIM slot to accommodate a single SIM card. For such devices, switching from one SIM card to another entails the steps of removing one SIM card and inserting another SIM card.

Instead of physically swapping the SIM cards, conventional SIM extenders allow inserting multiple SIM cards at once and allow selection of one SIM card through user interfaces. For example, conventional dual SIM extenders often include a SIM connector to connect to multiple SIM cards. Typically, one end of the SIM connector can be inserted into the user device SIM slot along with a first SIM card, and the other end of the SIM connector has a SIM slot for inserting a second SIM card. A list of both SIM cards is then displayed to the user on the user interface provided by the user device. The user then selects a SIM card for wireless communication. As such, the burden of SIM switching is still on the user. Further, in situations where a user wants different levels of monitoring and control for different SIM cards, e.g., using one SIM card for personal communication with less monitoring and a different SIM card for work with enterprise mobility management, conventional dual SIM extenders are not capable of active dual SIM management.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIG. 2A is a block diagram illustrating a simplified block diagram of the apparatus for dual SIM management in accordance with some embodiments;

FIG. 2B is a block diagram illustrating a switch for dual SIM access in accordance with some embodiments;

Figure 1:
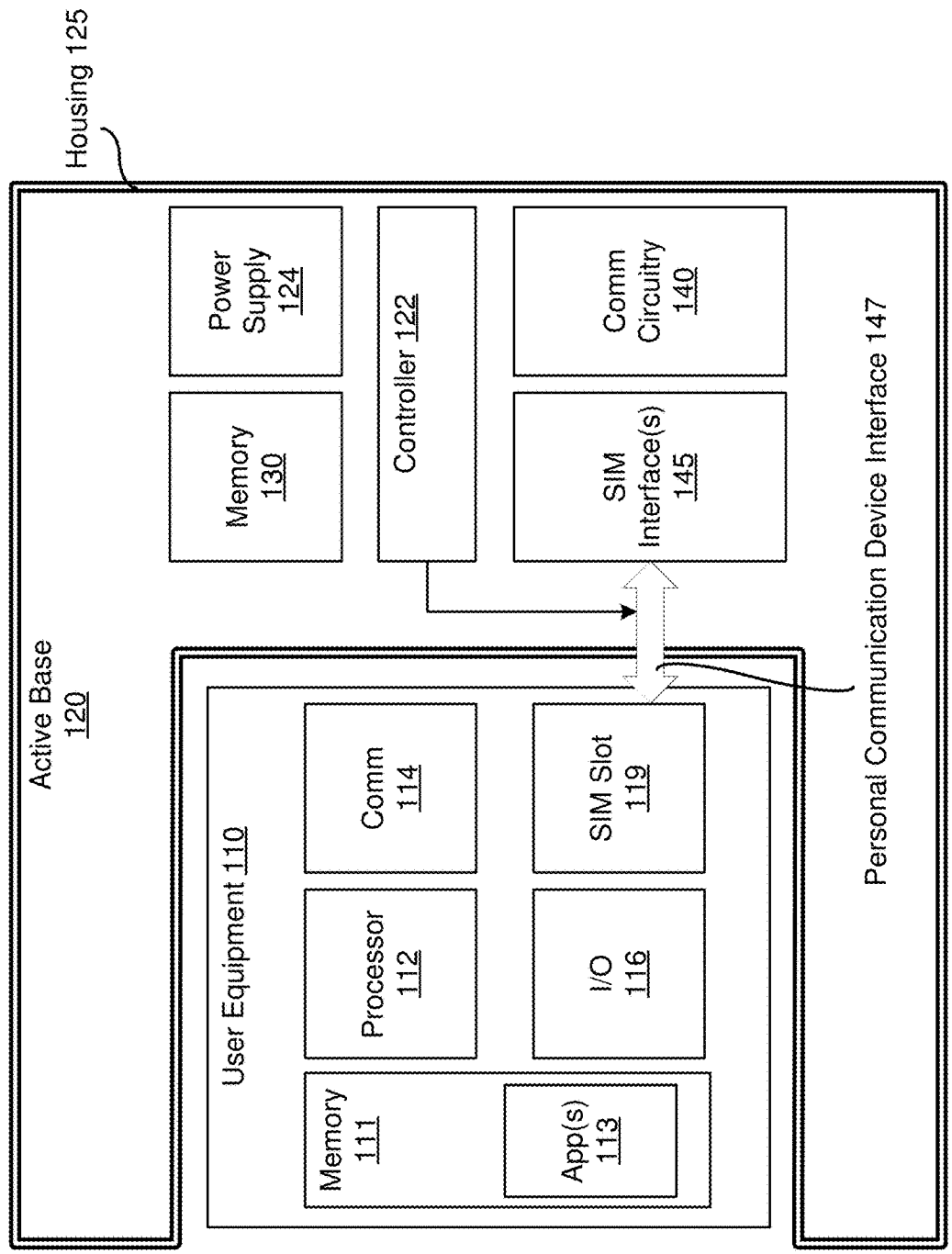
FIG. 1 is a block diagram of an exemplary apparatus holding a personal communication device in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus with dual SIM interfaces providing control over the SIM card switching. A conventional dual SIM extender is merely a multi-card reader that passively presenting multiple SIM cards for user selection. Different from the conventional multi-card reader, the apparatus described herein includes a housing arranged to hold a personal communication device and a controller operable to selectively couple one of a first SIM interface and a second SIM interface to a SIM slot of a personal communication device. The selectively coupling is effected through the operation of a personal communication device interface. In some embodiments, the personal communication device interface includes one or more switches to receive a SIM interface selection signal provided by the controller. In response to receiving the SIM interface selection signal, the personal communication device interface operates to connect the SIM slot of the personal communication device to different SIM interfaces. Additionally, in some embodiments, when connecting to different SIM interfaces, the controller receives information from the selected SIM card during wireless communication and uses the information for monitoring and control. The apparatus in accordance with the embodiments described herein thus provides seamless SIM switching. In various embodiments, the apparatus provides advantages when switching from a first mode (e.g., a personal mode) with less monitoring to a second mode (e.g., a work mode) with more control of the wireless communication.

In accordance with some embodiments, an apparatus includes a housing arranged to hold a personal communication device; a housing arranged to hold a personal communication device; a first subscriber identity module (SIM) interface; a second SIM interface; a personal communication device interface, a portion of which is shaped to mate with a SIM slot of the personal communication device, wherein the personal communication device interface includes a SIM emulator operable to couple the second SIM interface to the SIM slot of the personal communication device; and a controller operable to selectively couple one of the first SIM interface and the second SIM interface to the SIM slot of the personal communication device through operation of the personal communication device interface.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming but would nevertheless be a routine undertaking for those of ordinary skill in the art of image capture having the benefit of this disclosure.

Referring to FIG. 1, a simplified block diagram of an apparatus (e.g., an active base 120 or an active case) holding a personal communication device 110 (or a user equipment) is depicted, in accordance with some embodiments. Different from a conventional base or case that merely holds a personal communication device, the active base 120 has a controller 122 for providing a SIM interface selection signal and a personal communication device interface 147 operable to couple a SIM interface to the personal communication device 110. Further, the controller 122 has access to information stored on the SIM card(s) for wireless communication, so that the active base 120 can actively monitor wireless communication of the personal communication device 110.

In some embodiments, the active base 120 includes a housing 125 arranged to hold the personal communication device 110 (e.g., a smartphone, a wearable device, a tablet etc.). In some embodiments, the housing 125 includes a plurality of components mateable with another. In other words, the plurality of components of the housing 125, once mated with one another, form an assembly to hold the personal communication device 110. The assembly allows a user to insert the personal communication device 110 into the active base 120 or take the personal communication device 110 out of the active base 120.

For example, the active base 120 can have one or more moveable components (e.g., a hood) operable to slide to one or more positions (e.g., up or down) as well as non-moveable components. In such embodiments, the one or more moveable components, when in a first position (e.g., pushed down), are mateable (e.g., mechanically and/or electrically) with the non-moving components to form a housing assembly. The housing assembly forms a structure to at least partially support and hold the personal communication device 110, e.g., a partial enclosure as shown in FIG. 1 or a whole enclosure enclosing the personal communication device 110. When a moveable component is moved to certain position (e.g., hood up), the movement triggers the controller to provide a SIM interface selection signal to switch the personal communication device 110 from one mode of operation (e.g., a work mode) to a different mode of operation (e.g., a personal mode). In some embodiments, when a moveable component of the housing assembly is in a second position (e.g., slid up), the personal communication device 110 can be taken out of the housing 125 and placed in a different mode of operation (e.g., a personal mode).

In some embodiments, the active base 120 includes communication circuitry 140 supported by the housing 125. In some embodiments, the communication circuitry 140 connects the active base 120 to another electronic device (e.g., the personal communication device 110 or a remote server) wirelessly or through a wired connection. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the active base 120 includes one or more SIM interfaces 145. Each of the one or more SIM interfaces 145 is operable to removably receive a SIM card. Though FIG. 1 illustrates the SIM interface(s) as inside the active base 120, the SIM interface(s) can be inside or outside the housing 125. In some embodiments, one of the SIM interface(s) 145 is located outside the housing 125 and connectable to the controller 122 (e.g., via a flexible cable). The one or more SIM interfaces 145 along with a SIM card held by the one or more SIM interfaces 145 can be inserted into the SIM slot 119 of the personal communication device 110. In such embodiments, when the personal communication device 110 is taken out of the active base 120, the one or more SIM interfaces 145 remain inside the personal communication device 110 for wireless communication.

In some embodiments, the active base 120 includes a personal communication device interface 147, a portion (e.g., a SIM emulator) of which is shaped to mate with a SIM slot 119 of the personal communication device, e.g., a portion of the personal communication device interface 147 is the size of a SIM card. In some embodiments, the SIM emulator has integrated circuits and terminal layouts similar to a SIM card. Once inserted into the SIM slot 119, the SIM emulator is electrically coupled to the SIM slot 119 and operable to couple the one or more SIM interfaces 145 to the SIM slot 119. The SIM emulator is described in detail below with reference to FIGS. 3-5.

In some embodiments, the active base 120 includes a controller 122. The controller 122 is operable to selectively couple one of the one or more SIM interfaces 145 to the SIM slot 119 of the personal communication device 110 through operation of the personal communication device interface 147. The operation of the personal communication interface 147 is described in detail below with reference to FIGS. 2A-2B. In some embodiments, the controller 122 is on a single chip or chipset. The controller 122 can be embodied in a variety of forms, e.g., as various hardware-based processing means, as instructions stored in memory and executed by a processor, or as a combination of hardware, firmware, and software.

In addition to controlling the SIM interface selection, in some embodiments, the controller 122 is coupled to the communication circuitry 140 and operable to manage the communication channel with the personal communication device 110. Additionally, the controller 122 logs data passed through the communication channel in a secure area of the active base 120. Logging data in the secure area of the active base 120 has the advantage of providing trustworthy status report of the personal communication device 110 for analysis in case the personal communication device 110 has been compromised. For example, many high-value enterprises invest significantly to implement tight monitoring and access control within their own networks, but lose visibility into and control of external networks such as the cellular networks or WiFi hotspots. Once a smartphone is compromised, the status report from the phone operating system may not be trustworthy. Without network control, the spread of the threat (e.g., information leak) cannot be contained even if the threat is detected. By logging data in a secure area of the apparatus, a status report can be generated for enterprise mobility management (EMM), and EMM can then rely on the reliable information to confine the spread of the threat.

In some embodiments, the active base 120 includes a power supply 124. The power supply 124 supplies power to the communication circuitry 140 and the controller 122. In some embodiments, the power supply 124 includes at least one of a battery, a charging socket, a USB connector, a power plug, and/or a power socket. In some embodiments, the power supply 124 includes a connector for a battery.

In some embodiments, the personal communication device 110 held by the active base 120 includes a processor 112, one or more communication devices 114, an input/output interface 116, memory 111, applications 113, which further includes instructions stored in the memory 111 and executed by the processor 112, sensors, and a SIM slot 119. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some example embodiments, the processor 112 performs and/or controls performance of one or more functionalities of the one or more communication devices 114, in accordance with some embodiments. The processor 112 also performs data processing, application execution and/or other processing and management services according to some embodiments. In some embodiments, the processor 112 includes one or more chips, or one or more chipsets. The processor 112 and/or one or more further components of the one or more communication devices 114 can be configured to implement an embodiment on a single chip or chipset. The processor 112 can be embodied in a variety of forms. For example, the processor 112 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 112 can comprise a plurality of processors. The plurality of processors can be in operative communication with each other and can be collectively configured to perform one or more functionalities. In some example embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices. Memory 111 can include fixed and/or removable memory devices. In some embodiments, the memory 111 can provide a non-transitory computer-readable storage medium that can store computer program instructions (e.g., the application(s) 113) that can be executed by the processor 112. In some embodiments, the memory 111 is in communication with one or more of the processor 112, the input/output interface 116, the one or more communication devices 114, or sensors via a bus for passing information among components of the personal communication device 110. In some embodiments, the applications 113 stored in the memory 111 include, for example, an application associated with exchanging of information between the personal communication device 110 and an external electronic device (e.g., the active base 120). The exchanging of information includes, for example, a relay performed by an application for transferring information obtained by the one or more communication device 114 and/or sensors to an external electronic device.

In some embodiments, the input/output interface 116 carries the information exchanged between the processor 112 and input/output peripheral devices, such as a display, a keyboard, a mouse, a pen, microphones, cameras, and/or speakers of the personal communication device 110. In some embodiments, the input/output peripheral devices are connected to the input/output interface 116 wirelessly, e.g., via the communication devices 114.

In some embodiments, the one or more communication devices 114 connect the personal communication device 110 and an external electronic device wirelessly (e.g., using wireless modem) or through a wired connection. In some embodiments, the external electronic device is the active base 120, such that the one or more communication devices 114 connect to the active base 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11 ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the personal communication device 110 includes a SIM slot 119 coupled with the communication circuitry 140. The SIM slot 119 is operable to receive a SIM card or a SIM emulator. After receiving the SIM card, the SIM interface 119 is electrically connected to the SIM card or the SIM emulator and retrieves the identity from the SIM card or the SIM emulator for wireless communication.

Though not shown in FIG. 1, in some embodiments, the personal communication device 110 includes sensors, such as one or more accelerometers, gyroscopes, and/or magnetometers (e.g., as part of an inertial measurement unit (IMU)) for obtaining information concerning the position (e.g., altitude) of the personal communication device 110. In some embodiments, the sensors are coupled to the input/output interface 116, such that the information collected by the sensors are passed to the processor 112 by the input/output interface 116 for further processing. For example, the sensors collect sound or light information to be used by the microphone or camera. In some embodiments, the sensors are coupled to the one or more communication devices 114, such that the information collected by the sensors is transmitted to another device (e.g., the active base 120) for validation. In some embodiments, the sensor is coupled to a power supply (e.g., a battery) of the personal communication device 110 for obtaining the power level of the personal communication device 110.

FIG. 2A is a block diagram illustrating a simplified block diagram of the active base 120 for dual SIM management, in accordance with some embodiments. The active base 120 includes the controller 122 for providing a SIM interface selection signal. In some embodiments, a part of the personal communication device interface 147, e.g., a SIM emulator 210 (or an emulator), is shaped to mate with the SIM slot 119 of the personal communication device 110. In some embodiments, another part of the personal communication device interface 147 includes one or more switches 220. The controller 122 controls the selection of the SIM cards 230 and 240 by providing the SIM interface selection signal to the one or more switches 220. In response to the SIM interface selection signal, the one or more switches 220 selectively couple one of the SIM interfaces holding the SIM cards 230 and 240 to the SIM slot 119. Thus, the controller controls the selective coupling of the SIM interfaces through the operation of the personal communication device interface 147.

The SIM cards 230 and 240 can be any suitable type of integrated circuit card ("ICC"), chip card, memory card, flash memory card, microprocessor card, smart card, such as a subscriber identity module ("SIM") card (e.g., a mini-SIM card or a micro-SIM card), or combinations thereof. The SIM cards 230 and 240 contain electronic circuitry, from which the personal communication device 110 can read data and/or to which the personal communication device 110 can write data. For example, one side of the SIM cards 230 and 240 can have a contact terminal plate with a plurality of terminals connected to the embedded electronic circuitry, e.g., Vcc, RST, CLK, GND, I/O, and reserved terminals according to ISO standard.

FIG. 2B is a block diagram illustrating the one or more switches 220 for dual SIM access, in accordance with some embodiments. In some embodiments, the one or more switches 220 are analog with no moving parts. In some embodiments, the one or more switches 220 are electro-mechanical with moving parts. In some embodiments, the one or more switches 220 are integrated with the SIM emulator 210. In some embodiments, the operation of the one or more switches 220 are through the personal communication device 110, e.g., a selection through an interface of the personal communication device 110. In some embodiments, the one or more switches 220 are hardware switches supported by the active base 120 that can be toggled between various modes. In some embodiments, the one or more switches 220 comprise integrated circuits in packages and/or contains multiple switches.

For example, the one or more switches 220 can include a first switch 220-1 and a second switch 220-2, and the first switch 220-1 further includes switch A and switch B.

In some embodiments, the states of the first switch 220-1 are as follows:

State 0: switch A is enabled, and switch B is disabled;
State 1: switch B is enabled, and switch A is disabled;
State 2: both switch A and switch B are disabled.

In some embodiments, when in a first mode of operation, e.g., a personal mode, the first switch 220-1 is at state 0 and the second switch 220-2 is at state 0 (disabled or not closed or not connecting one end of switch B to the second SIM card 240), such that the SIM slot 119 is connected to the first SIM card 230 (e.g., a personal SIM card) and disconnected from the second SIM card 240 (e.g., a work SIM card). When in a second mode of operation, e.g., a work mode, the first switch 220-1 is at state 1 and the second switch 220-2 is at state 1 (enabled or closed or connecting one end of switch B to the second SIM card 240), such that the SIM slot 119 is connected to the second SIM card 240 (e.g., a work SIM card) and disconnected from the first SIM card 230 (e.g., a personal SIM card). When in a third mode of operation, e.g., a quarantine mode to disconnect from wireless communication, the first switch 220-1 is at state 2 and the second switch 220-2 is at state 0 (disabled or not closed or not connecting one end of switch B to the second SIM card 240), such that the SIM slot 119 is disconnected from the SIM cards 230 and 240. As such, through the operation of the one or more switches 220, the controller 122 selectively couples the SIM slot 119 to the SIM card 230 or the SIM card 240.

It should be noted that the one or more switches 220 in FIG. 2B can be located internal or external to the housing 125 of the active base 120. For example, one or more switches 220 can be integrated with a SIM emulator to be placed inside the SIM slot 119. Further, in some embodiments, the controller 122 can replace one or more switches 220 to selectively couple the SIM cards 230 or 240 to the SIM slot 119. Various embodiments will be described in detail below with reference to FIGS. 3-5.

In FIGS. 2A and 2B, the controller 122 is the man-in-the-middle (MITM) between the personal communication device 110 and the first SIM card 230 and/or the second SIM card 240. Having the controller 122 as the MITM allows the controller 122 to relay the communication from the personal communication device 110 to SIM(s). More importantly, having the controller 122 as the MITM allows the controller 122 to extract cellular parameters (e.g., international mobile subscriber identity (IMSI), location information, session keys etc.) from the first SIM card 230 and/or the second SIM card 240. The active base 120 can then use the extracted cellular parameters for uplink monitoring of the wireless traffic.

Figure 3:
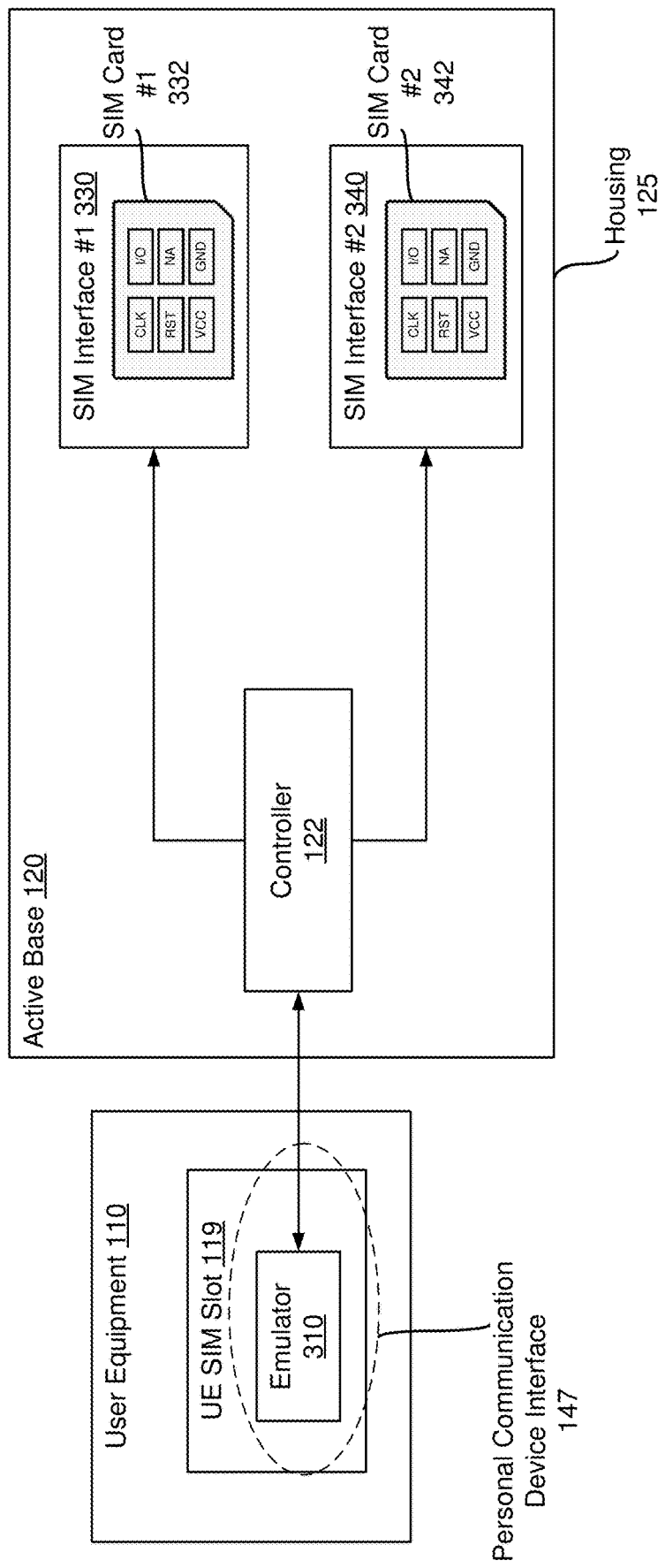
FIG. 3 is an illustration of an exemplary apparatus, where SIM interfaces are located outside the user equipment held by the apparatus in accordance with some embodiments.
Figure 4:
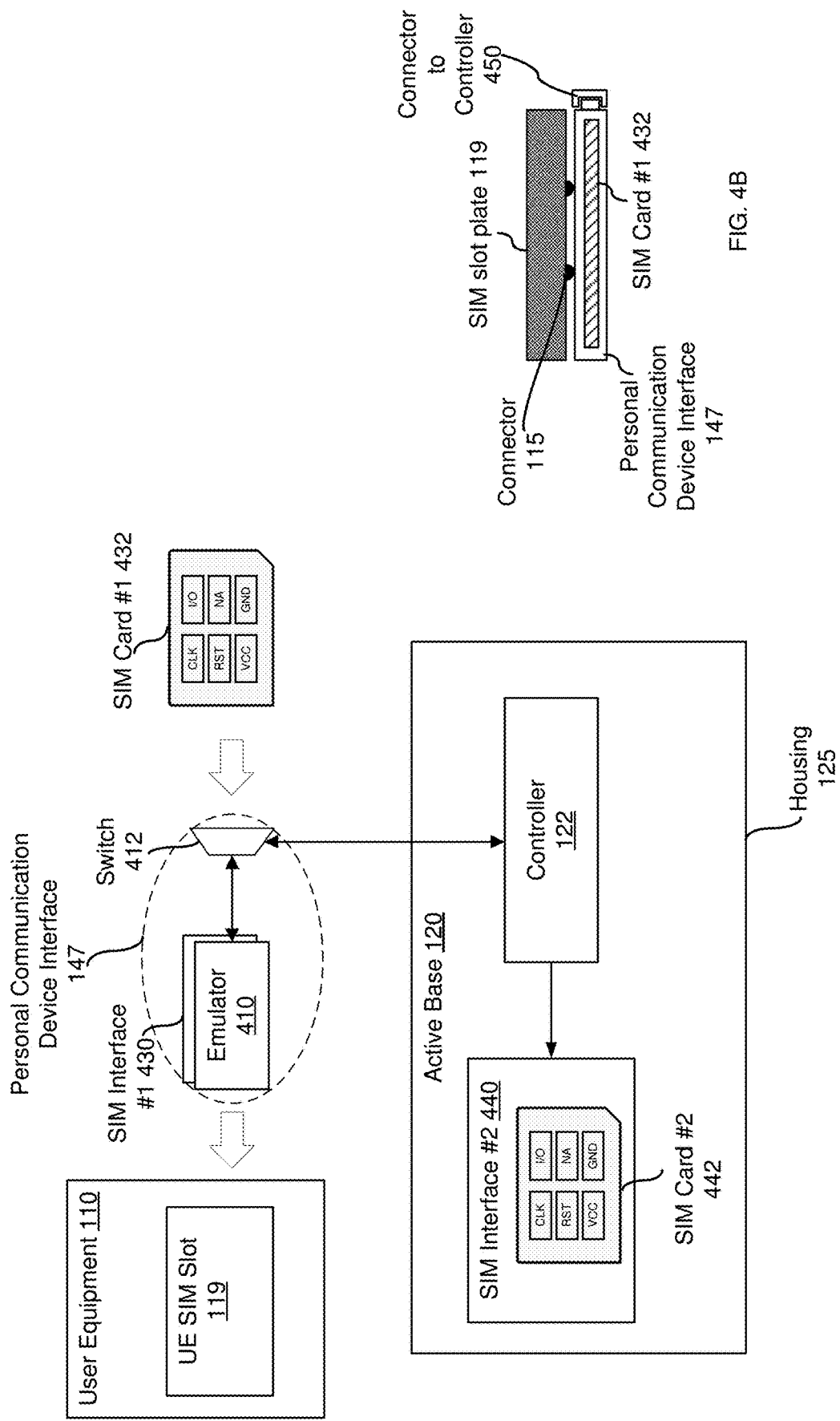
FIG. 4A is an illustration of an exemplary apparatus with a controller controlling dual SIM in accordance with some embodiments.
FIG. 4B is an illustration of an integrated personal communication device interface holding a SIM card inside a SIM slot in accordance with some embodiments.

Turning to FIG. 3, FIG. 3 illustrates one embodiment of the active base 120, where SIM interfaces are located outside the personal communication device 110. In some embodiments, the active base 120 includes the housing 125, the controller 122, the personal communication device interface 147, a first SIM interface 330 holding a first SIM card 332 and a second SIM interface 340 holding a second SIM card 342, in accordance with some embodiments. In some embodiments, both the first SIM interface 330 and the second SIM interface 340 are supported by the housing 125 and coupled to the controller 122, while other components of the active base 120 may or may not be supported by the housing 125.

In some embodiments, a part of the personal communication device interface 147 is a SIM emulator 310 (or an emulator) shaped to mate with the SIM slot 119. In some embodiments, the SIM emulator 310 is any suitable type of integrated circuit card ("ICC"), chip card, memory card, flash memory card, microprocessor card, smart card, or combinations thereof. In some embodiments, the SIM emulator 310 contains electronic circuitry, from which the personal communication device 110 can read data. For example, one side of the SIM emulator 310 has a plurality of terminals to emulate terminals such as Vcc, RST, CLK, GND, I/O, and reserved of a SIM card connected to the emulator 310.

When the SIM emulator 310 slides into the SIM slot 119, the SIM emulator 310 is held in a space under the SIM slot 119 plate. The SIM slot 119 has connectors that are connected to circuitry of the SIM emulator 310. In some embodiments, the connectors are contact pins or contact pads, such that springy pins or pads protrude from the surface of the SIM slot 119 plate to be in contact with terminals of the SIM emulator 310 circuitry.

Though not shown in FIG. 3, in some embodiments, the personal communication device interface 147 includes one or more switches to receive a SIM interface selection signal provided by the controller 122. Coupled with the SIM emulator 310, the switch connects the SIM emulator 310 to the first SIM interface 330 or the second SIM interface 340 in response to receiving a SIM interface selection signal from the controller 122.

In some embodiments, instead of switch(es), the controller 122 selectively couples the first SIM interface 330 or the second SIM interface 340 to the SIM emulator 310. When the first SIM interface 330 is enabled in a first mode (e.g., a personal mode), the first SIM interface 330 holding the first SIM card 332 is electrically coupled to the SIM emulator 310. As a result, the SIM emulator 310 emulates the first SIM card 332 (e.g., a personal SIM card). On the other hand, when the second SIM interface 340 is enabled in a second mode (e.g., a work mode), the second SIM interface 340 holding the second SIM card 342 (e.g., a work SIM card) is electrically coupled to the SIM emulator 310. As a result, the emulator 310 emulates the second SIM. As such, the SIM slot 119 is connected to the first SIM card 332 or the second SIM card 342 through the operation of the SIM emulator 310.

In FIG. 3, the controller 122 has access to information stored on the SIM cards 332 and 342, e.g., by connecting to the terminals Vcc, RST, CLK, and I/O of the SIM cards 332 and 342. As a result, the controller 122 can extract circuitry cellular parameters (e.g., international mobile subscriber identity (IMSI), location information, session keys, etc.) from the SIM cards 332 and 334. The active base 120 can then use the extracted cellular parameters for uplink monitoring of the wireless traffic when either the first SIM card 332 or the second SIM card 342 is used for wireless communication.

Turning to FIG. 4A, FIG. 4A is a block diagram illustrating one embodiment of the active base 120 with the controller 122 controlling dual SIM, in accordance with some embodiments. In some embodiments, the active base 120 includes the housing 125, the controller 122, the personal communication device interface 147, and a second SIM interface 440 holding a second SIM card 442. In some embodiments, the second SIM interface 440 is supported by the housing 125 and coupled to the controller 122. The controller 122 thus has access to information stored on the second SIM card 442 held by the second SIM interface 440, e.g., by connecting to the terminals Vcc, RST, CLK, and I/O of the second SIM card 442 through the second SIM interface 440. Consequently, the controller 122 can extract circuitry cellular parameters (e.g., international mobile subscriber identity (IMSI), location information, session keys etc.) from the second SIM card 442 when the second SIM card 442 is used by the personal communication device 110 for wireless communication. In other words, the controller 122 is the MITM for the second SIM card 442.

In some embodiments, a part of the personal communication device interface 147 is a SIM emulator 410 (or an emulator) shaped to mate with the SIM slot 119. In some embodiments, similar to the SIM emulator 310 (FIG. 3), the SIM emulator 410 is any suitable type of integrated circuit card ("ICC"), chip card, memory card, flash memory card, microprocessor card, smart card, or combinations thereof. In some embodiments, the SIM emulator 410 contains electronic circuitry, from which the personal communication device 110 can read data. For example, one side of the SIM emulator 410 has a plurality of terminals to emulate terminals such as Vcc, RST, CLK, GND, I/O, and reserved of a SIM card connected to the SIM emulator 410.

In some embodiments, the personal communication device interface 147 also includes a switch 412 to receive a SIM interface selection signal provided by the controller 122. In some embodiments, the SIM emulator 410 is integrated with the switch 412, e.g., the switch 412 is attached to the SIM emulator 410. In some embodiments, the personal communication device interface 147 is further integrated with a first SIM interface 430 to receive and hold a first SIM card 432. When the integrated personal communication device interface 147 holding the first SIM card 432 slides into the SIM slot 119, the integrated personal communication device 147 is held in a space under the SIM slot 119 plate, as shown in FIG. 4B. The SIM slot 119 has connectors 115 (depicted in FIG. 4B) connected to circuitry of the SIM emulator 410. In some embodiments, the connectors 115 are contact pins or contact pads, such that the springy pins or pads protrude from the surface of the SIM slot 119 plate to be in contact with terminals of the SIM emulator 410 circuitry. Through the switch 412 integrated with the emulator 410 and coupled to the first SIM interface 430, either the first SIM interface 430 holding the first SIM card 432 or the second SIM interface 440 holding the second SIM card 442 is electrically connected to the SIM slot 119.

In some embodiments, as shown in FIG. 4B, the personal communication device interface 147 includes a connector 450 to connect to the controller 122. In some embodiments, the connector 450 includes a first component (e.g., SIM tray pogo pins) connected to the personal communication device interface 147 and a second component mateable with the first component and connected to the controller 122. In some embodiments, in a first mode of operation (e.g., the personal mode), the first component is detached from the second component when the personal communication device 110 is removed from the active base 120. In some embodiments, in a second mode of operation (e.g., the work mode), the first component is mated with the second component (e.g., connected, attached, and/or snapped together) in order to connect the controller 122 to the personal communication device interface 147. In some embodiments, in the first mode of operation (e.g., the personal mode), upon detecting the detachment of the second component, the switch 412 automatically connects the first SIM interface 430 integrated with the personal communication device interface 147 to the SIM slot 119. In other words, when the active base 120 is a non-personal mode (e.g., in a work mode), upon detecting detachment of the second component, the case 120 goes to the first mode (e.g., the personal mode). As such, when the personal communication device user removes the personal communication device 110 from the active base 120, the personal communication device interface 147 remains mated with the SIM slot 119 and the personal communication device 110 uses the first SIM card 432 for wireless communication. On the other hand, upon detection of attachment of the second component, e.g., when the used equipment 110 is inserted into the housing 125 of the apparatus, the active base 120 switches from the first mode (e.g., the personal mode) to the second mode (e.g., the work mode) in accordance with some embodiments. Alternatively, in some other embodiments, upon detection of attachment of the second component, the firmware (programmable) of the case 120 decides whether to switch from switches from the first mode (e.g., the personal mode) to the second mode (e.g., the work mode).

Figure 5:
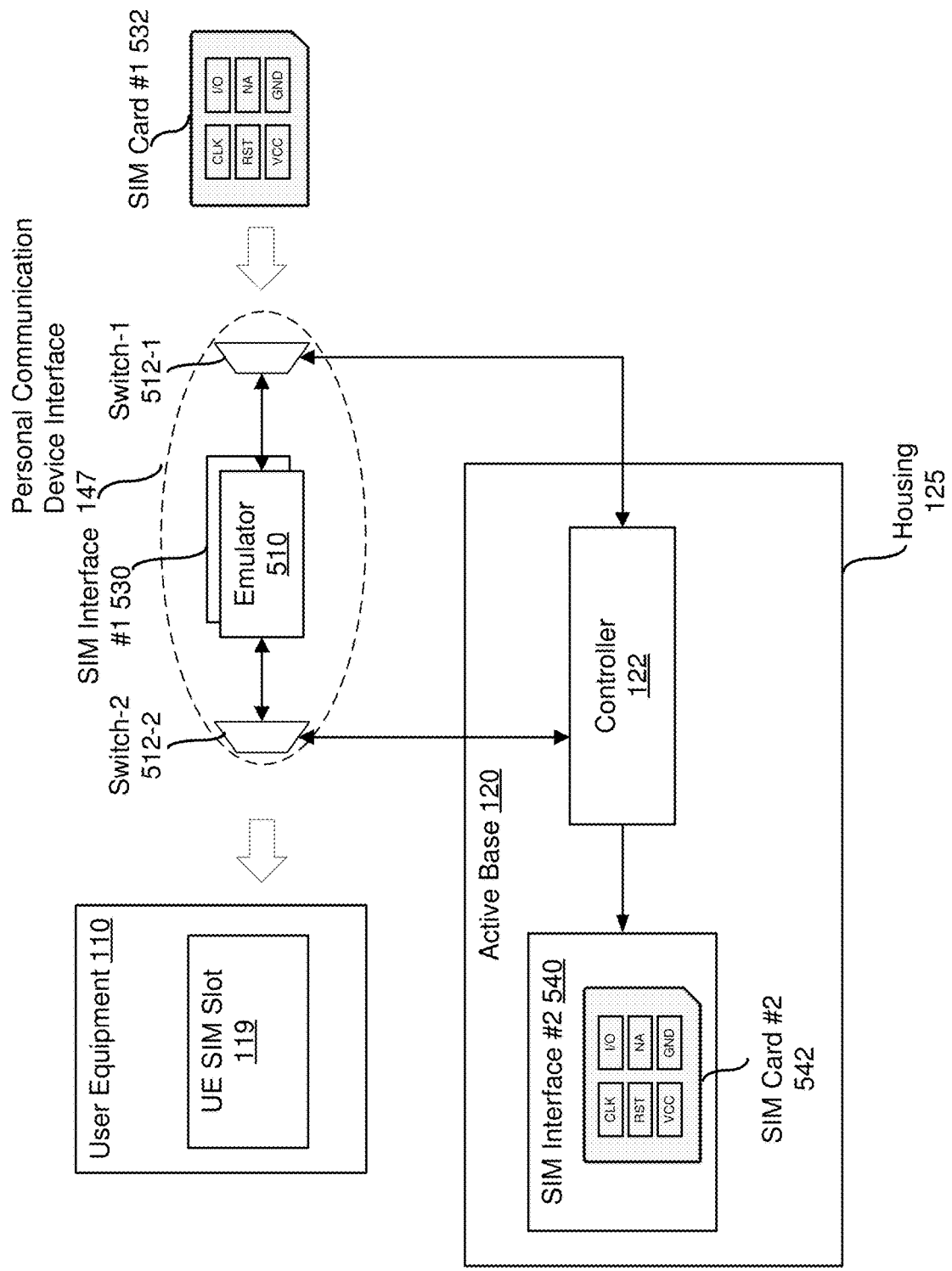
FIG. 5 is an illustration of a system including the apparatus for dual SIM management, where the personal communication device interface includes two switches in accordance with some embodiments.

Turning to FIG. 5, FIG. 5 illustrates another embodiment of the active base 120 for dual SIM management, where the personal communication device interface 147 includes two switches 512-1 and 512-2. In some embodiments, the active base 120 includes the housing 125, the controller 122, the personal communication device interface 147, and a second SIM interface 540 holding a second SIM card 542. In some embodiments, the second SIM interface 540 is supported by the housing 125 and coupled to the controller 122.

In some embodiments, a part of the personal communication device interface 147 is a SIM emulator 510 (or an emulator) shaped to mate with the SIM slot 119. In some embodiments, similar to the SIM emulators 310 (FIG. 3) and 410 (FIG. 4A), the SIM emulator 510 is any suitable type of integrated circuit card ("ICC"), chip card, memory card, flash memory card, microprocessor card, smart card, or combinations thereof. In some embodiments, the SIM emulator 510 contains electronic circuitry, from which the personal communication device 110 can read data. For example, one side of the SIM emulator 510 has a plurality of terminals to emulate terminals such as Vcc, RST, CLK, GND, I/O, and reserved of a SIM card connected to the SIM emulator 510.

In some embodiments, the SIM emulator 510 is integrated with a first SIM interface 530, a first SIM interface 530, a first switch 512-1 and a second switch 512-2 to form an integrated personal communication device interface 147. Similar to the switch 412 (FIG. 4A), the first switch 512-1 is coupled to the first SIM interface 530 and connectable to the controller 122, such that the first switch 512-1 is operable to selectively couple the first SIM interface 530 or the second SIM interface 540 to the SIM slot 119, in response to receiving a SIM interface selection signal from the controller 122.

In some embodiments, the second switch 512-2 is coupled to the SIM emulator 510 and connectable to the controller 122. In a first mode of operation (e.g., the personal mode), the controller 122 provides the SIM interface selection signal to the first switch 512-1 to connect the SIM emulator 510 to the first SIM card 532 (e.g., the personal SIM card) via the first SIM interface 530. Additionally, in a first mode of operation, the second switch 512-2 also receives the SIM interface selection signal, and in response, the second switch 512-2 connects the controller 122 to the first SIM card 532 via the SIM emulator 510 and the first SIM interface 530, so that the controller 122 can receive information from the first SIM card 532.

In the embodiment shown in FIG. 5, similar to the embodiment shown in FIG. 4A, the controller 122 has access to information stored on the second SIM card 442 by connecting to the terminals Vcc, RST, CLK, and I/O of the second SIM card 442 through the second SIM interface 440. As a result, the controller 122 can extract circuitry cellular parameters (e.g., international mobile subscriber identity (IMSI), location information, session keys, etc.) from the second SIM card 542 when the second SIM card 542 is used by the personal communication device 110 for wireless communication. Different from the embodiment shown in FIG. 4A, the embodiment shown in FIG. 5, the controller 122 is also the MITM for the first SIM card 532. By enabling the second switch 512-2, the controller 122 is connected to the terminals Vcc, RST, CLK, and I/O of the first SIM card

532. As a result, the controller 122 can extract circuitry cellular parameters (e.g., international mobile subscriber identity (IMSI), location information, session keys etc.) from the first SIM card 532, when the first SIM card 532 is used by the personal communication device 110 for wireless communication. In other words, the controller is the MITM for both the first SIM card 532 and the second SIM card 542. Consequently, in either the first mode or the second mode of operation, the active base 120 can track and monitor wireless communication using the extracted SIM card information from either the first SIM card 532 or the second SIM card 542.

In the embodiments shown in FIGS. 4A-4B and 5, the controller 122 can play a passive role or an active role. For example, in FIG. 6A, the controller 122 passively taps communication between the personal communication device 110 and the SIM card(s). In other words, the controller 122 as MITM sniffs the network traffic but does not alter the content in accordance with some embodiments. On the other hand, in FIG. 6B, the controller 122 as MITM actively interfaces with both the personal communication device 110 and the SIM card(s), such that the controller 122 relays the network traffic between the personal communication device 110 and the SIM card(s) and parses the network traffic to extract information. Because the SIM card has radio access information, cell tower information, and location information, the controller 122 can use such information to extract information from the network traffic, thus actively validate the network traffic.

Figure 6B:
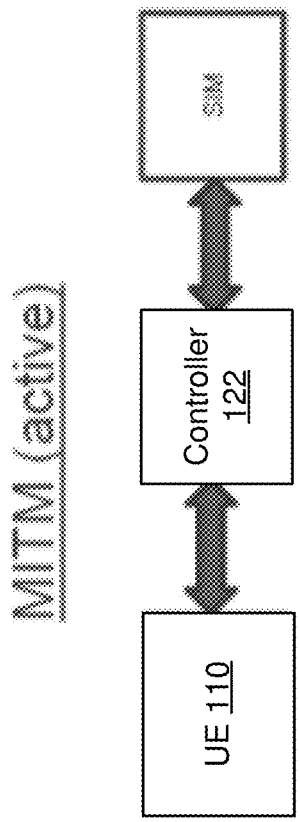
FIG. 6B is an illustration of a controller actively tapping communication between the personal communication device and the SIM card(s) in accordance with some embodiments.
Figure 6A:
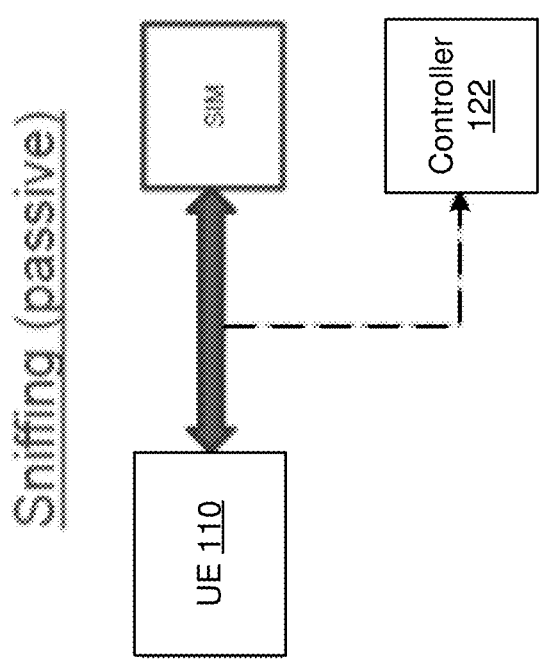
FIG. 6A is an illustration of a controller passively tapping communication between the personal communication device and the SIM card(s) in accordance with some embodiments.

Relative to the passive mode of sniffing as shown in FIG. 6A, having the controller 122 as the active MITM as shown in FIG. 6B saves energy. In the passive mode of sniffing, the controller 122 constantly monitors the communication path between the personal communication device 110 and the SIM card(s), regardless whether there is network traffic from the personal communication device 110 or not. In comparison, in the active mode, the network traffic to/from the personal communication device 110 triggers the active mode. Thus, when there is no network communication, the information parsing and extracting function of the controller 122 does not need to be active. As such, the active mode as shown in FIG. 6B saves energy. Further, in some embodiments, by having the controller 122 as the active MITM, the risk of packet collision when the personal communication device 110 and the controller 122 both issue commands to the SIM card simultaneously can be reduced. Thus, having the controller 122 as the active MITM as shown in FIG. 6B provides a more robust access to the SIM card(s).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a personal communication device;
   a first subscriber identity module (SIM) interface;
   a second SIM interface;
   a personal communication device interface, a portion of which is shaped to mate with a SIM slot of the personal communication device inside the personal communication device, wherein the personal communication device interface includes a SIM emulator operable to couple the second SIM interface to the SIM slot of the personal communication device; and
   a controller operable to detect a mode of operation and selectively couple one of the first SIM interface and the second SIM interface to the SIM slot of the personal communication device according to the mode of operation through operation of the personal communication device interface.

2. The apparatus of claim 1, wherein the first SIM interface and the second SIM interface are supported by the housing and coupled to the controller.

3. The apparatus of claim 1, wherein the SIM emulator is further operable to selectively couple the first SIM interface or the second SIM interface to the SIM slot of the personal communication device in response to a SIM interface selection signal provided by the controller according to the mode of operation.

4. The apparatus of claim 1, wherein the personal communication device interface includes a switch to receive a SIM interface selection signal provided by the controller according to the mode of operation.

5. The apparatus of claim 4, wherein the switch is a first switch, coupled to the first SIM interface and connectable to the controller, and operable to selectively couple the first SIM interface or the second SIM interface to the SIM slot of the personal communication device, in response to receiving a SIM interface selection signal from the controller.

6. The apparatus of claim 5, wherein the personal communication device interface further includes a second switch, coupled to the SIM emulator and connectable to the controller, wherein in a first mode of operation, the second switch connects the controller to the SIM emulator in order to enable the controller to receive information from a first SIM card held by the first SIM interface.

7. The apparatus of claim 1, wherein the first SIM interface is integrated with the personal communication device interface.

8. The apparatus of claim 1, wherein the personal communication device interface includes a connector, the connector includes a first component connected to the personal communication device interface and a second component connected to the controller, wherein detecting the mode of operation includes:
   detecting the apparatus is in a first mode of operation in response to detecting the first component is detached from the second component when the personal communication device is removed from the apparatus; and
   detecting the apparatus is in a second mode of operation in response to detecting the first component is mated with the second component in order to connect the controller to the personal communication device interface.

9. The apparatus of claim 8, wherein in the first mode of operation, the personal communication device interface connects the SIM slot of the personal communication device to the first SIM interface.

10. The apparatus of claim 1, wherein the controller receives information from a SIM card coupled with the second SIM interface.

11. The apparatus of claim 1, wherein the controller issues a SIM interface selection signal in response to an input received by the apparatus.

12. The apparatus of claim 1, wherein the housing includes a moving component mateable with non-moving components to form a housing assembly and triggers the controller to provide a SIM interface selection signal when the moving component is in a first position indicating a first mode of operation.

13. A method comprising:
    at an apparatus holding a personal communication device, the apparatus including a housing arranged to hold the personal communication, a first subscriber identity module (SIM) interface, a second SIM interface, a personal communication device interface, and a controller, wherein a portion of the personal communication device interface is shaped to mate with a SIM slot inside the personal communication device:
    receiving an input to connect a first SIM interface or a second SIM interface of the apparatus to the personal communication device; and
    in response to receiving the input, detecting a mode of operation and instructing a personal communication device interface of the apparatus to operate to selectively couple the first SIM interface or the second SIM interface to the SIM slot of the personal communication device according to the mode of operation, wherein the personal communication device interface includes a SIM emulator operable to couple the second SIM interface to the SIM slot of the personal communication device.

14. The method of claim 13, wherein instructing the personal communication device interface of the apparatus to operate to selectively couple the first SIM interface or the second SIM interface to the SIM slot of the personal communication device includes providing, by the controller, according to the mode of operation, a SIM interface selection signal to at least one switch of the personal communication device interface.

15. The method of claim 13, wherein instructing the personal communication device interface of the apparatus to operate to selectively couple the first SIM interface or the second SIM interface to the SIM slot of the personal communication device includes providing, by the controller, according to the mode of operation, a SIM interface selection signal to the SIM emulator of the personal communication device interface.

16. The method of claim 13, further comprising receiving information from a SIM card coupled with the first SIM interface or the second SIM interface.

17. The method of claim 13, further comprising:
    monitoring a communication path between the personal communication device and a SIM card coupled with the first SIM interface or the second SIM interface.

18. The method of claim 17, further comprising:
    detecting network communication to or from the personal communication device based on the information from the SIM card;
    in response to detecting the network communication, parsing the information from the SIM card to extract information associated with the network communication; and
    validating the information associated with the network communication.

19. The method of claim 13, wherein:
    the input includes an insertion or removal of the personal communication device from the housing; and
    detecting the mode of operation includes determining by the controller a first mode of operation in response to detecting the removal of the personal communication device and a second mode of operation in response to detecting the insertion of the personal communication device.

20. The method of claim 19, wherein selectively coupling the first SIM interface of the second SIM interface to the SIM slot of the personal communication device accordingly to the mode of operation includes:
    automatically connecting the first SIM interface with the SIM slot through operation of the personal communication device interface in accordance with detecting switching from the second mode of operation to the first mode of operation.

* * * * *